US010731886B2

(12) United States Patent
Li et al.

(10) Patent No.: US 10,731,886 B2
(45) Date of Patent: Aug. 4, 2020

(54) HVAC SYSTEM INCLUDING ENERGY ANALYTICS ENGINE

(71) Applicant: Carrier Corporation, Palm Beach Gardens, FL (US)

(72) Inventors: Sheng Li, Shanghai (CN); Xinyu Wu, Shanghai (CN); Xing Cai, Shanghai (CN); Stella M. Oggianu, West Hartford, CT (US); Jun Pyo Lee, Zionsville, IN (US); Marcin Cychowski, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 57 days.

(21) Appl. No.: 16/039,419

(22) Filed: Jul. 19, 2018

(65) Prior Publication Data
US 2019/0024928 A1    Jan. 24, 2019

Related U.S. Application Data

(60) Provisional application No. 62/535,025, filed on Jul. 20, 2017.

(51) Int. Cl.
| | |
|---|---|
| F24F 11/00 | (2018.01) |
| G05B 13/00 | (2006.01) |
| F24F 11/47 | (2018.01) |
| F24F 11/64 | (2018.01) |
| G05B 13/02 | (2006.01) |

(Continued)

(52) U.S. Cl.
CPC .............. *F24F 11/47* (2018.01); *F24F 11/61* (2018.01); *F24F 11/62* (2018.01); *F24F 11/64* (2018.01); *G05B 13/026* (2013.01); *G05B 13/0265* (2013.01); *G05B 15/02* (2013.01); *F24F 11/56* (2018.01); *F24F 11/65* (2018.01); *F24F 2110/10* (2018.01); *F24F 2110/12* (2018.01); *F24F 2120/12* (2018.01);

(Continued)

(58) Field of Classification Search
CPC .............................. F24F 11/47; G05B 13/0265
See application file for complete search history.

(56) References Cited

U.S. PATENT DOCUMENTS

| | | |
|---|---|---|
| 6,478,233 B1 | 11/2002 | Shah |
| 8,849,771 B2 | 9/2014 | Berg-Sonne |

(Continued)

OTHER PUBLICATIONS

"Building Analytics—Improve the Efficiency, Occupant Comfort, and Financial Well-Being of your Building"; http://www.schneider-electric.us/documents/buildings/Building-Analytics-Brochure.pdf; Dec. 2013; 8 pages.

*Primary Examiner* — Mark A Connolly
(74) *Attorney, Agent, or Firm* — Cantor Colburn LLP (57) ABSTRACT

A heating, ventilation, and air conditioning (HVAC) energy management control system includes an HVAC system configured to deliver at least one of heated air and cooled air to a targeted area; and a computing server including an HVAC energy analytics engine in signal communication with the HVAC system. The HVAC energy analytics engine is configured to actively learn historical data of the HVAC system based on at least one of the heated air and the cooled air produced over a time period. The HVAC energy analytics engine determines a predicted energy consumption of the HVAC system based on the historical data, and the HVAC system operates based on the predicted energy consumption.

19 Claims, 4 Drawing Sheets

(51) Int. Cl.
  G05B 15/02   (2006.01)
  F24F 11/61   (2018.01)
  F24F 11/62   (2018.01)
  *F24F 11/56*    (2018.01)
  *F24F 11/65*    (2018.01)
  *F24F 140/60*   (2018.01)
  *F24F 110/10*   (2018.01)
  *F24F 110/12*   (2018.01)
  *F24F 120/12*   (2018.01)
  *F24F 140/50*   (2018.01)

(52) U.S. Cl.
  CPC ....... *F24F 2140/50* (2018.01); *F24F 2140/60* (2018.01); *G05B 2219/2642* (2013.01)

(56) References Cited

U.S. PATENT DOCUMENTS

| | | | |
|---|---|---|---|
| 9,104,211 B2 | 8/2015 | Fadell | |
| 9,146,548 B2 | 9/2015 | Chambers | |
| 9,342,082 B2 | 5/2016 | Guenette | |
| 9,429,961 B2 | 8/2016 | Sprinkle | |
| 9,557,750 B2 | 1/2017 | Gust | |
| 2006/0065750 A1 | 3/2006 | Fairless | |
| 2009/0327299 A1* | 12/2009 | Schwartz | G06F 16/1834 |
| 2011/0166710 A1* | 7/2011 | Kordik | H02J 3/14 |
| | | | 700/277 |
| 2012/0323382 A1 | 12/2012 | Kamel | |
| 2014/0074542 A1* | 3/2014 | Edens | G06Q 50/06 |
| | | | 705/7.25 |
| 2014/0156088 A1 | 6/2014 | Li | |
| 2014/0365017 A1 | 12/2014 | Hanna | |
| 2015/0178421 A1 | 6/2015 | Borrelli | |
| 2015/0178865 A1 | 6/2015 | Anderson | |
| 2016/0246269 A1 | 8/2016 | Ahmed | |
| 2016/0327299 A1* | 11/2016 | Ribbich | F24F 11/30 |
| 2016/0370771 A1 | 12/2016 | Torres Fuchslocher | |
| 2016/0377309 A1 | 12/2016 | Abiprojo | |
| 2017/0051934 A1 | 2/2017 | Verhoeven | |
| 2017/0124466 A1 | 5/2017 | Li | |

* cited by examiner

HVAC SYSTEM INCLUDING ENERGY ANALYTICS ENGINE

CROSS-REFERENCE TO RELATED APPLICATIONS

This application claims the benefit of U.S. Provisional Application No. 62/535,025 filed Jul. 20, 2017, which is incorporated herein by reference in its entirety.

BACKGROUND

Various non-limiting embodiments of the disclosure pertain to the art of heating, venting, and air conditioning (HVAC) systems, and more particular, to a monitoring and control system of an HVAC system.

Conventional HVAC systems are typically operated by manipulating a thermostat to select a desired temperature set point that for a given living area or occupancy zone. The efficiency of the HVAC system can be improved using digital thermostats that allow a user to schedule operating times and/or temperatures of the HVAC system at different times of the day. Accordingly, the HVAC system can be automatically switched off or set to less desirable temperatures at times of the day where rooms are not occupied, and automatically switched on to operate at a more desirable temperature during times when rooms are expected to be occupied.

BRIEF DESCRIPTION

According to a non-limiting embodiment, a heating, ventilation, and air conditioning (HVAC) energy management control system includes an HVAC system configured to deliver at least one of heated air and cooled air to a targeted area; and a computing server including an HVAC energy analytics engine in signal communication with the HVAC system. The HVAC energy analytics engine is configured to actively learn historical data of the HVAC system based on at least one of the heated air and the cooled air produced over a time period. The HVAC energy analytics engine determines a predicted energy consumption of the HVAC system based on the historical data, and the HVAC system operates based on the predicted energy consumption.

According to one or more additional features, the system includes at least one electronic terminal device in signal communication with the computing server. The electronic terminal device is configured to deliver at least one HVAC unit characteristic to the HVAC energy analytics engine.

According to one or more additional features, the HVAC system includes an HVAC unit that generates the heated air and the cooled air, and an HVAC controller that is configured to receive a temperature set point value, and to control the HVAC unit based on a temperature set point value.

According to one or more additional features, the historical data includes operation data, and the HVAC controller determines the operation data in response to generating, via the HVAC unit, at least one of the heated air and the cooled air.

According to one or more additional features, the operation data includes at least one of start times of the HVAC unit, stop times of the HVAC unit, run time duration of the HVAC unit, temperature settings with respect to a time of day, and room occupancy with respect to a time of the day, power usage, gas usage, cooling capacity, heating capacity, set temperature over a time period, and actual room temperature over the time period.

According to one or more additional features, the HVAC energy analytics engine comprises an HVAC performance module, an HVAC historical data module, a thermal load module, and an energy prediction module. The HVAC performance module is configured to generate at least one HVAC performance map that models a performance capability of the HVAC unit based on the at least one HVAC unit characteristic. The HVAC historical data module is configured to determine the historical data based on the operation data generated by the HVAC controller. The thermal load module is configured to determine a thermal load characteristic of the targeted area. The energy prediction module is configured to calculate a predicted HVAC energy consumption of the HVAC system.

According to one or more additional features, the HVAC unit characteristics include at least one of the type of HVAC unit, the manufacture of the HVAC unit, the performance rating data of the HVAC unit, area to heated/cooled, and number of total HVAC units per building/house.

According to one or more additional features, the historical data is calculated as time-series data based on an indoor temperature value (Tidb), and outdoor temperature value (Todb) and an HVAC capacity (Cap) of the HVAC unit.

According to one or more additional features, the thermal load characteristic is based on a temperature differential (k1) between an indoor temperature of the targeted area and an outside temperature, an injected air capacity (k2) output to the targeted area, and temperature loads (C) applied to the targeted area.

According to one or more additional features, the temperature differential (k1), the injected air capacity (k2) and the temperature loads (C) are actively determined over time based on the operation data.

According to one or more additional features, the thermal load characteristic is determined in response to calculating a derivative of indoor temperature versus time.

According to one or more additional features, the energy prediction controller calculates a predicted HVAC operating cost based on the predicted HVAC energy consumption and a local energy cost, obtained through an active communication with the utility provider.

According to one or more additional features, the local energy cost includes real-time pricings of at least one of natural gas and electricity.

According to one or more additional features, the real-time pricings are obtained from at least one of the HVAC controller, the terminal device, and the computing network.

According to one or more additional features, the HVAC controller actively controls the HVAC unit based on at least one of the predicted HVAC energy consumption, the predicted HVAC operating cost, and at least one user preference.

According to one or more additional features, the energy prediction controller generates at least one HVAC performance report indicating at least one of current energy consumption, predicted energy consumption, current operating costs, predicted operating costs, cost savings strategies, energy savings reports based on setting comparisons, equipment upgrade suggestions, and real-time local energy pricings.

According to one or more additional features, the at least one terminal device displays the at least one HVAC performance report received from the energy prediction controller.

According to one or more additional features, the energy prediction module is configured to obtain first historical data of a first HVAC system installed in a first building and second historical data of a second HVAC system installed in a different second building, and compares energy performances between the first HVAC system with the second HVAC system based on the first and second historical data.

According to another non-limiting embodiment, a method of operating a heating, ventilation, and air conditioning (HVAC) energy management control system comprises delivering, using an HVAC unit, at least one of heated air and cooled air to a targeted area. The method further includes actively learning, using an HVAC energy analytics engine installed in a computing network, historical data of the HVAC system based on at least one of the heated air and the cooled air produced over a time period. The method further comprises determining, using the HVAC energy analytics engine, a predicted energy consumption of the HVAC system based on the historical data, and operating the HVAC system based on the predicted energy consumption.

According to one or more additional features, the method includes delivering, via an electronic terminal device, at least one HVAC unit characteristic of the HVAC unit; generating, via the HVAC energy analytics engine, at least one HVAC performance map that models a performance capability of the HVAC unit based on the at least one HVAC unit characteristic; determining, via the HVAC energy analytics engine, a historical data of the HVAC unit based on operation data of the HVAC unit; determining, via the HVAC energy analytics engine, a thermal load characteristic of the targeted area; calculating, via the HVAC energy analytics engine, a predicted HVAC energy consumption of the HVAC unit; and operating the HVAC unit based on the predicted HVAC energy consumption.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

Conventional HVAC control systems typically monitor only the temperature of one or more rooms in a building or house to operate an HVAC unit according to a target temperature set point value set by the user. However, various additional building characteristics and exterior environmental conditions can cause deviations between the desired or target HVAC performance and the actual HVAC performance In addition, daily variations in exterior environmental conditions and/or energy prices can cause deviations in a user's targeted operating costs compared to the actual operating costs.

Various non-limiting embodiments of the disclosure provide a HVAC energy management and control system that includes an HVAC energy analytics engine configured to automatically determine additional energy parameters, such as exterior temperature trends, historical HVAC usage data, current energy prices, and user occupancy history. In this manner, the HVAC energy management and control system can automatically control the HVAC system based on scheduled temperatures and times, along with predicted energy consumption and/or predicted operating costs to increase operating efficiency and more closely meet a user's targeted operating costs.

Figure 1:
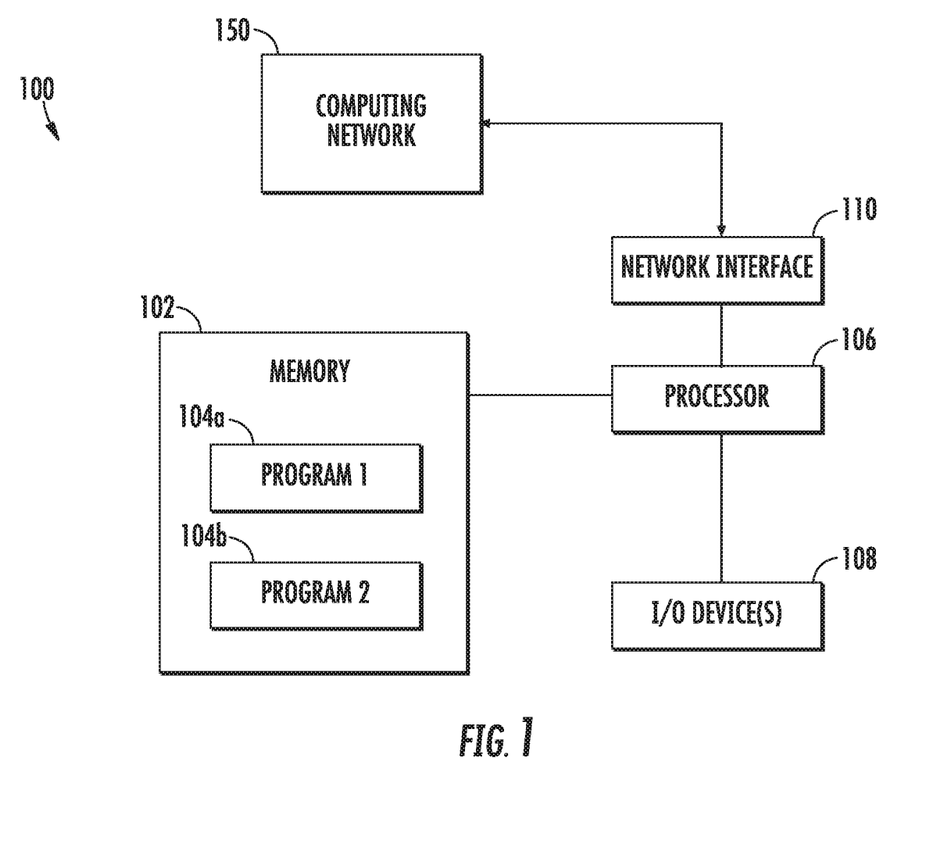
FIG. 1 is a block diagram of a computing system according to a non-limiting embodiment.

With reference now to FIG. 1, a computing system 100 capable of performing one or more embodiments is illustrated. The computing system 100 includes a memory 102 and an electronic hardware processor or controller 106. The memory 102 stores various instructions algorithms which are executable by the controller 106. The memory 102 can also store set operating schedules, parameters and historical data obtained from the computing network 150, the controller 106 and/or the I/O devices 108. The executable instructions can be stored or organized in any manner and at any level of abstraction, such as in connection with one or more processes, routines, procedures, methods, functions, etc. As an example, at least a portion of the instructions are shown in FIG. 1 as being associated with a first program 104a and a second program 104b. The programs 104a and 104b can include HVAC control programs and/or scheduling software that capable of automatically controlling an HVAC system.

The processor or electronic controller 106 can be included in a computing system that is installed in a computing network, a mobile computing device, or a local control system such as, for example, an HVAC control system. The computing network can include a cloud-based computing network including one or more cloud-computing servers. The controller 106 electrically communicates with the memory 102 via one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, a telephone or mobile device (e.g., a smartphone), etc. The I/O device(s) 108 may be configured to provide an interface such as a thermostat interface, for example, to allow a user to interact with the system 100.

The computing system 100 further includes a network interface 110 capable of electrical communication with a computing network 150. The computing network 150 can be implemented as a local on-site network and/or a cloud computing network. The network interface 110 includes any communication device (e.g., a modem, wireless network adapter, etc.) that operates according to a network protocol (e.g., Wi-Fi, Ethernet, satellite, cable communications, etc.) which establishes a wired and/or wireless communication with the computing network 150.

The computing system 100 is illustrative as an example. In some embodiments, one or more of the entities may be optional. In some embodiments, additional entities not shown may be included. For example, in some embodiments the computing system 100 may be associated with one or more networks, such as one or more computer or telephone networks. In some embodiments, the entities may be arranged or organized in a manner different from what is shown in FIG. 1.

Figure 2:
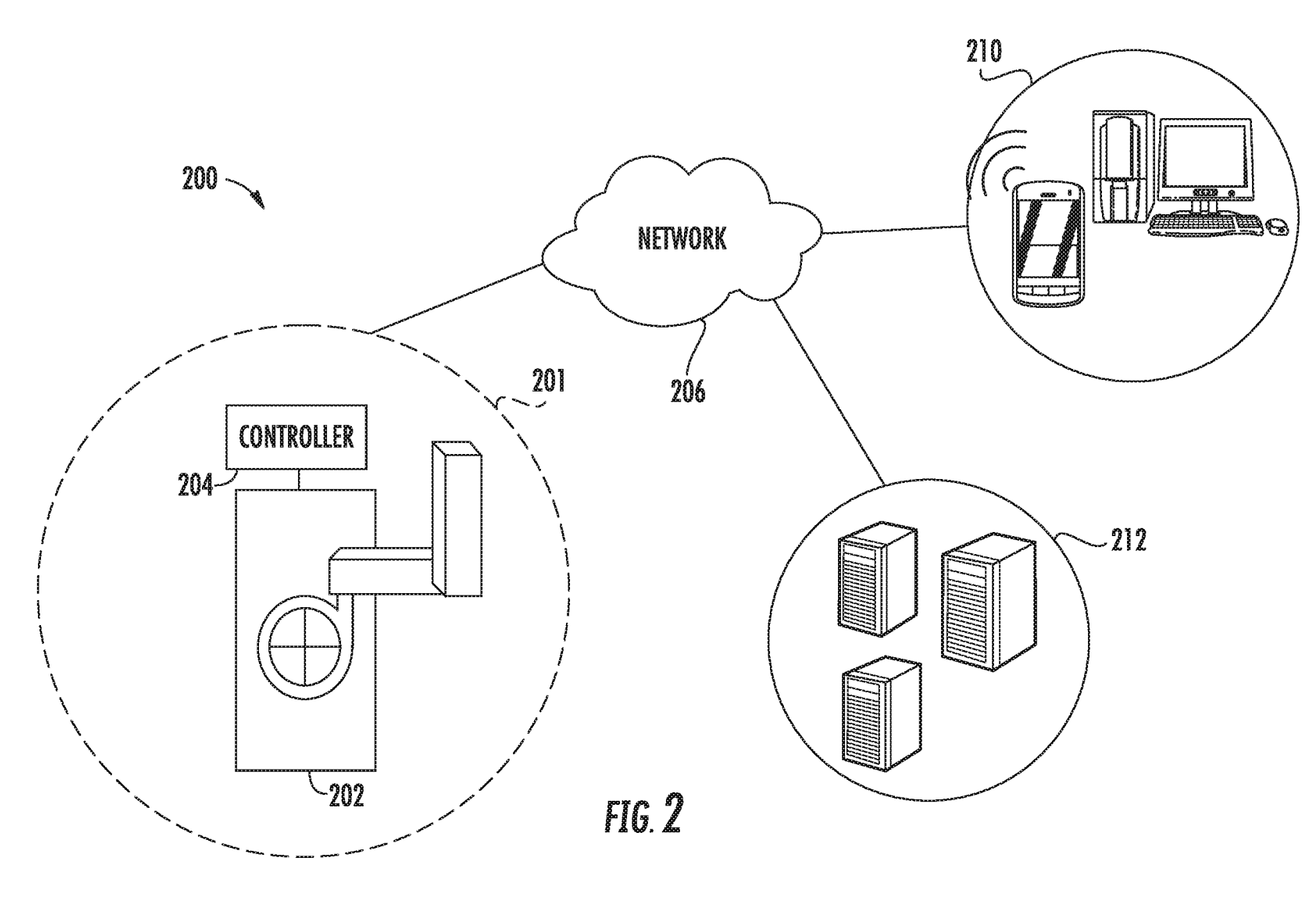
FIG. 2 illustrates a network-based HVAC system in accordance with one or more non-limiting embodiments.

Turning now to FIG. 2, a block diagram illustrates an HVAC control network 200 in accordance with one or more non-limiting embodiments. The HVAC control network 200 is in signal communication with an HVAC system 201 that includes one or more HVAC units 202. Although a single HVAC unit 202 is illustrated, it should be appreciated that the HVAC system 201 can include additional HVAC units. For example, the HVAC unit 202 may be included in a group of HVAC units. An HVAC group may include additional HVAC units (not shown) located at different areas of a building or house, or even in a different home.

The HVAC unit 202 is in signal communication with one or more electronic controllers 204. The controller 204 includes a digital thermostat, for example, configured to control operation of the HVAC unit 202. Although one controller 204 is illustrated, it should be appreciated that multiple controllers can be located remotely from one another. Each controller 204 can control the HVAC unit 202.

The controller 204 can perform various functions including, but not limited to, switching on and off the HVAC unit 202, selecting a mode (e.g., heating mode, cooling mode, etc.) of the HVAC unit 202, setting a desired room temperature at which to operate the HVAC unit 202, and setting operating schedules at which to operate the HVAC unit 202. The controller 204 also includes a memory capable storing temperature set points, operating schedules and historical data such as for example, historical run-time data and historical temperature recovery data. The controller 204 is also in signal communication with one or more sensors configured to detect and monitor various conditions such as, for example, room temperatures and humidity. In this manner, the controller 204 can actively control the HVAC unit 202 to achieve and/or maintain a room temperature set point value and/or set according to an operating schedule.

One or more of the controllers 204 may be in signal communication with a network 206. In some embodiments, the network 206 may include a data network, a computer network, a telephone network, a cloud network, etc. The network 206 can also be implemented in connection additional cloud computing platforms. The network 206 may be in signal communication with one or more electronic user terminal devices 210. The terminal devices 210 include, but are not limited to, a desktop computer, a laptop computer, and a mobile device (e.g., a cell phone, smartphone, smart wearable device, etc.). In some embodiments, the controller 204 may communicate with a user device 210 via the network 206. In some embodiments, the controller 204 may communicate directly with a user device 210. For instance, the controller 204 may be capable of communicating directly with the user device 210 via a short-range communication protocol such as, for example, Bluetooth.

The HVAC control network 200 may be used to schedule one or more run-time operations. For example, a user may indicate, via the electronic user terminal device 210, that they are going to be arriving at their house at a particular time. Such an indication may be provided in connection with a calendar associated with the user or the user device 210. Alternatively, the user's arrival at the house may be inferred or deduced based on the user's history. For example, global positioning system (GPS) or other location techniques may be used to obtain the user's location and time stamp. The data can be delivered from a user device 210 to the controller 204, via the network 206, such that the user's occupancy duration in the house can be determined on a daily basis. Based on the occupancy data, the controller 204 can determine (i.e., learn) the times the user enters, stays, and leaves the house. In this manner, the controller 204 can automatically control the HVAC unit 202 based on the learned occupancy data.

Thus, as described above, a controller 204 (or other computing device or entity) may leverage occupancy data to actively control the HVAC unit 202. Such scheduling may be further enhanced if exterior environmental data and/or energy cost data is obtained, e.g., from the network 206. For example, the controller 204 is in signal communication with the network 206 and can obtain weather trends and weather forecasts stored on various servers 212. In this manner, the controller 204 can automatically adjust the settings of the HVAC unit 202 to take into account weather conditions. The controller 204 can also obtain, via the network 206 and/or the devices 210, real-time local energy costs (natural gas prices, power prices, etc.) stored on the servers 212. These energy prices can also be manually input to the controller 204 and updated at any time. In this manner, the user can set a target daily/monthly energy cost, and the controller 204 can operate the HVAC unit 202 to achieve or substantially achieve the user's targeted energy cost.

Figure 3:
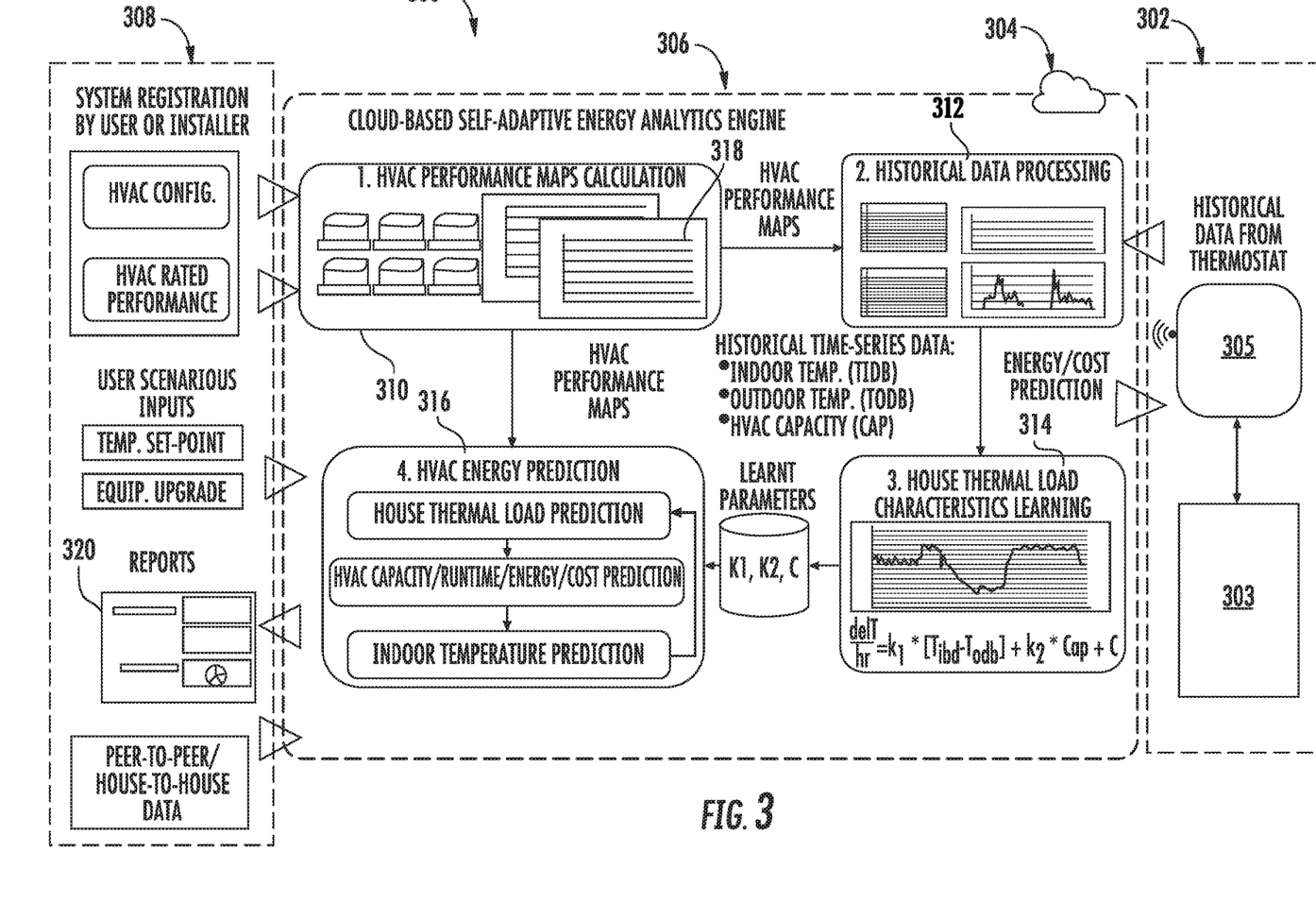
FIG. 3 illustrates a cloud-based HVAC energy management and control system that includes an HVAC energy analytics engine according to a non-limiting embodiment.

Turning now to FIG. 3, a HVAC energy management and control system 300 is illustrated according to a non-limiting embodiment. The HVAC energy management and control system 300 includes an HVAC system 302 in signal communication with computing network 304 which employs an HVAC energy analytics engine 306. The computing network 304 can include a cloud-based network, and the HVAC energy analytics engine 306 can be a cloud-based HVAC energy analytics engine 306 installed in the cloud network. The HVAC energy analytics engine 306 can also be stored locally stored, e.g., implemented in the local controller (e.g., digital thermostat). The computing network 304 and HVAC energy analytics engine 306 may also be in signal communication with one or more terminal devices 308.

The HVAC system 302 includes an HVAC unit 303 in signal communication with a controller 305 such as, for example, a digital thermostat. The HVAC unit 303 and controller 305 operate together to produce at least one of heated air and cooled air to regulate the internal temperature of a dwelling (house, building, etc.) The controller 305 can include one or more temperature sensors (not shown) that monitor the internal temperature. The internal temperature is compared to a set target temperature, and the HVAC unit 303 is controlled to achieve and/or maintain the internal temperature at the set target temperature. Accordingly, a feedback control system is established to maintain the dwelling, or rooms within the dwelling, at a targeted temperature setpoint value. The controller 305 can also receive set schedules at which to operate the HVAC unit 303 as described above. The schedules can be received from the terminal device 308 and/or can be manually input directly to the controller 305 by an occupant of the dwelling.

The controller 305 is also configured to monitor operation of the HVAC unit 303. In this manner, the controller 305 can generate operation data based the heated air and/or the cooled air produced to achieve and maintain the target temperature setpoint. The operation data includes, but is not limited to HVAC unit start times, stop times, run time duration, and temperature settings with respect to a time of day. In addition, the controller 305 can communicate with a terminal device 308 to detect whether a particular room or the dwelling is occupied by an occupant. Accordingly, the controller 305 can determine room occupancy with respect to a time of the day. In other words, the controller 305 can detect when a person enters or leaves a room or dwelling, and can maintain an occupancy history of the dwelling or particular room with respect to certain times of the day.

The terminal device 308 includes, but is not limited to, a laptop computer, desktop computer, a smart phone, and a smart wearable device such as a smart watch, for example. The terminal device 308 is configured to deliver information and data to the HVAC energy analytics engine 306 and/or the controller 305 via the computing network 304. In at least one embodiment, the terminal device 308 can send HVAC unit characteristics to the HVAC energy analytics engine 306. The HVAC unit characteristics include the type of HVAC unit 303, the manufacture of the HVAC unit 303, the performance rating data of the HVAC unit 303 (e.g., the performance rating maximum rated output performance per units of energy consumed), target area to be heated/cooled, and the number of total HVAC units per dwelling.

Additional information can be sent to the HVAC energy analytics engine 306 including updated HVAC equipment information. The updated HVAC equipment information can indicate whether a new HVAC unit has been installed in the HVAC system 302. The terminal device 308 can also send temperature setpoints and/or operating schedules to the HVAC energy analytics engine 306 and/or the controller 305. The terminal device 308 also includes a display unit which can display HVAC operating data including current operating conditions and energy reports including historical operating performance and operating performance forecasts with predicted energy consumption data.

The HVAC energy analytics engine 306 includes an HVAC performance module 310, an HVAC historical data module 312, a thermal load module 314, and an energy prediction module 316. Any one of the HVAC performance module 310, the HVAC historical data module 312, the thermal load module 314, and the energy prediction module 316 can be constructed as an electronic hardware controller that includes memory and a processor configured to execute algorithms and computer-readable program instructions stored in the memory.

The HVAC performance module 310 is configured to generate one or more HVAC performance maps 318. The performance maps 318 model performance capabilities of the HVAC unit 303 based on the HVAC unit characteristics received, for example, by the terminal device 308. The performance maps 318 include, for example, a system capacity (Cap) map indicating a performance of the HVAC unit 303 based on a targeted operating area (e.g., area of the dwelling or given room) with respect to a given outside air temperature (OAT). Another performance map 318, for example, includes an energy efficiency ratio (EER) map, which indicates the rated cooling output of the HVAC unit 303 in British thermal units (BTU's) per hour divided by the rated input of energy in watts of electricity, at a given humidity, and given temperature input/output conditions.

The HVAC historical data module 312 is configured to determine historical data of the HVAC unit 303 based on the operation data received from the module 305. In at least one embodiment, the historical data is calculated as time-series data based on an indoor temperature value (Tidb), and outdoor temperature value (Todb) and an HVAC capacity (Cap) of the HVAC unit 303. The historical data can serve as actively learned coefficients, which are then utilized by the HVAC energy analytics engine 306 to generate energy prediction models as described herein.

The thermal load module 314 is configured to determine a thermal load characteristic of a target area (e.g., target room or entire house/building). The thermal load characteristic is based on a temperature differential (k1) between an indoor temperature of the targeted area and an outside temperature, an injected air capacity (k2) output to the target area, and various temperature loads (C) such as, for example, solar load and internal loads. The internal loads include, but are not limited to, heat sources such as, for example, occupant body heat, thermal heat output by working equipment, plugged-in electrical devices, lighting, increased heat caused by cooking meals, etc. The thermal load characteristic can be represented as a temperature recovery rate (delT/hr). The temperature recovery rate (delT/hr) can be determined as a derivative of indoor temperature versus time. For instance, delT/hr can be calculated according to the following equation:

$$\frac{delT}{hr} = k_1 \cdot [T_{idb} - T_{odb}] + k_2 \cdot Cap + C \qquad [\text{Eq. 1}]$$

In at least one embodiment, temperature differential (k1), injected air capacity (k2) and temperature load(s) (C) are actively determined (i.e., learned) over time based on the operation data received from the controller 305. In this manner, the thermal load characteristics can be actively learned (i.e., actively monitored and stored in memory) by monitoring the indoor temperature variation rate, determining the outdoor temperature, determining a differential between the indoor temperature and the outdoor temperature, and determining HVAC capacity (i.e., cooling capacity and/or heating capacity).

The energy prediction module 316 is configured to calculate one or more predicted HVAC parameters of the HVAC system 302. The predicted HVAC parameters include, but are not limited to, a thermal load prediction of a targeted area (e.g. given room or entire dwelling) to be heated or cooled, predicted HVAC unit runtimes, predicted energy consumption, and predicted operating costs. The energy prediction module 316 can utilize input temperature target setpoints, operating schedules, and/or equipment characteristics to determine the predicted HVAC parameter. In at least one non-limiting embodiment, the energy prediction module 316 calculates a predicted HVAC operating cost based on a predicted energy consumption and local energy costs. The local energy costs include, for example, real-time prices of natural gas and/or electricity. The real-time pricings of natural gas and electricity can be stored in the computing network 304, and can be obtained from the controller 305 and/or the terminal device 308. In this manner, the controller 305 can actively control the HVAC unit 303 based on the predicted HVAC energy consumption and/or the predicted HVAC operating cost. In at least one embodiment, a user of the HVAC system 302 can over-ride the predicted energy consumption settings and/or the predicted HVAC operating costs settings.

The energy prediction module 316 can also perform peer-to-peer or building-to-building comparisons. For example, energy prediction module 316 can obtain temperature and performance data from surrounding buildings, homes, etc., and compare the HVAC energy performance in one building to another building based on HVAC historical operation data.

The energy prediction module 316 is also configured to generate one or more HVAC performance reports 320. The HVAC performance reports 320 are indicate of various aspects of the HVAC system 302 including, but not limited, current energy consumption, predicted energy consumption, current operating costs, predicted operating costs, cost savings strategies, energy savings reports based on setting comparisons, equipment upgrade suggestions, and real-time local energy pricings. The energy prediction module 316 can also query external resources (e.g., the Internet), via the network 304, to determine various equipment upgrades that can improve performance (e.g., energy efficiency and cost reduction) of the HVAC system 302. The equipment upgrades can then be sent to the terminal device 308 such that a user may be provided additional options for meeting their target energy consumption and operating cost goals. Accordingly, the HVAC energy management and control system 300 allows a user or occupant of a dwelling can manage and control the HVAC system 302 to meet targeted energy consumption goals and/or operating costs.

Figure 4:
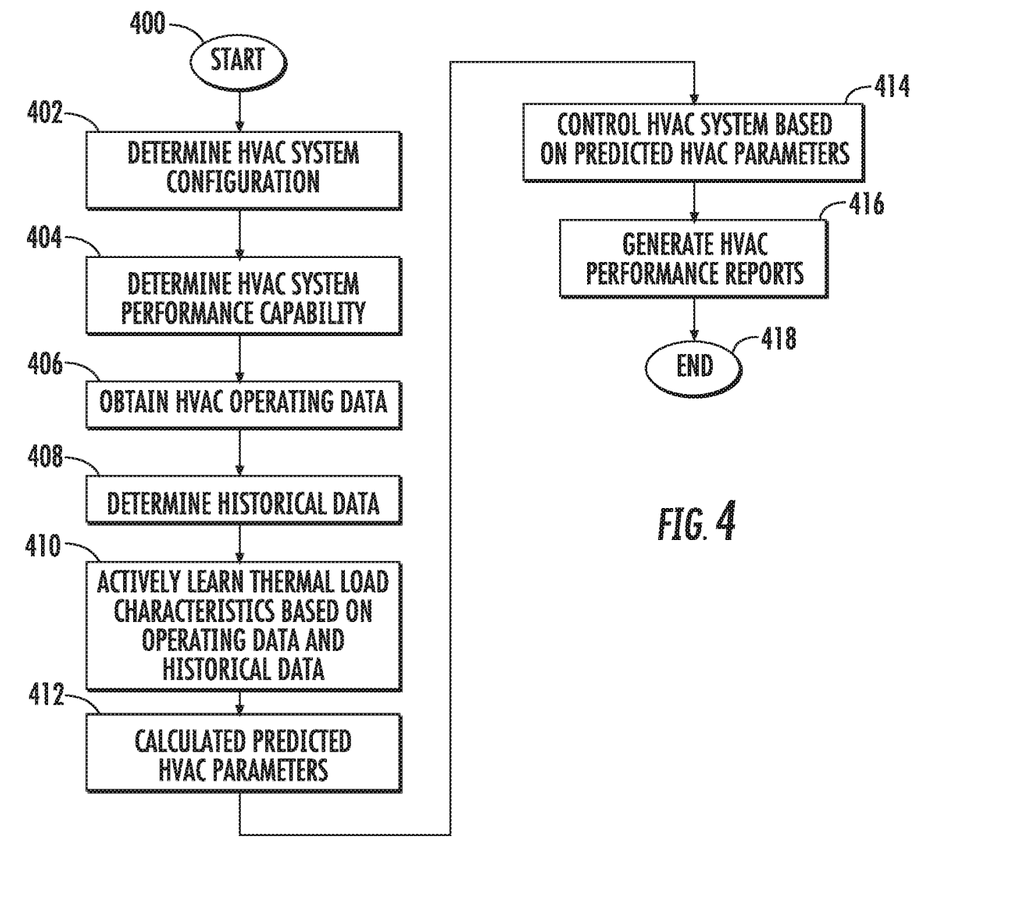
FIG. 4 is flow diagram illustrating a method of operating an HVAC energy management and control system according to a non-limiting embodiment.

Referring now to FIG. 4, a flow diagram illustrates operation of an HVAC energy management and control system according to a non-limiting embodiment. In one or more embodiments, the HVAC energy management and control system is a cloud-based HVAC energy management and control system. The method begins at operation 400, and at operation 402 a configuration of an HVAC system is determined by an HVAC energy analytics engine installed in a computing server. In at least one embodiment, the computing server is a cloud-computing server. The HVAC system configuration can be sent to the HVAC energy analytics engine using a terminal device (e.g., smart phone, laptop computer, etc.), and/or by a controller (e.g., digital thermostat) in signal communication with the computing network. At operation 404, the performance capability of the HVAC system is determined based on the configuration of the HVAC system. At operation 406, operation data of the HVAC system is obtained. The operation data can be obtained from the HVAC controller, and can be communicated to the HVAC energy analytics engine in real-time, and/or can be delivered in response to a data request sent by the HVAC energy analytics engine. The operation data includes, for example, HVAC unit running time, power usage (e.g., kW per hour), cooling capacity (e.g., kW per hour), gas usage (e.g., kW per hour), heating capacity e.g., (Kw per hour), set temperature per hour, and actual room temperature per hour. At operation 408, historical data of the HVAC system is determined. In at least one embodiment, the historical data is calculated as time-series data based on an indoor temperature value (Tidb), and outdoor temperature value (Todb) and an HVAC capacity (Cap) of the HVAC unit.

Turning to operation 410, thermal load characteristics of the HVAC system are determined. In at least one embodiment, the HVAC energy analytics engine actively determines (i.e., learns) the thermal load characteristics based on the operation data and the historical data. At operation 412, one or more predicted HVAC parameters of the HVAC system are determined. In at least one embodiment, the predicted HVAC parameters include thermal load prediction of a targeted area to be heated or cooled, predicted HVAC unit runtimes, predicted energy consumption, and predicted operating costs. At operation 414, the HVAC unit is controlled based on one or more of the predicted HVAC parameters. At operation 416, one or more performance reports are generated, and the method ends. The performance reports include various analytical data including, but not limited to, current energy consumption, predicted energy consumption, current operating costs, predicted operating costs, cost savings strategies, energy savings reports based on setting comparisons, equipment upgrade suggestions, and real-time local energy pricings. In at least one embodiment, the HVAC energy analytics engine generates the reports and communicates the reports to a terminal device in signal communication with the computing network. The reports can be displayed via the terminal device such that a user is able to monitor the operating performance and energy efficiency of the HVAC system. Based on the reports, the user can also input changes to settings of the HVAC unit via the terminal device in order to meet energy and cost targets. The input settings are then relayed to controller via the computing network such that the HVAC system can be adjusted to meet the user's expected targets.

As described above, various non-limiting embodiments provide an HVAC energy tacking and management system that includes an energy analytics engine. The energy analytics engine can be constructed as a cloud-based energy analytics engine capable of automatically learning (i.e., actively monitoring and recording) a buildings characteristics based on historical HVAC data. The historical HVAC data includes, for example, historical thermostat data, outdoor air temperature, runtime, etc. In this manner, the HVAC system can interact with building occupants via a computing application stored on a user device such as, for example, a smart phone to meet the user's expected targets.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As used herein, the term "module" or "unit" can refer to an application specific integrated circuit (ASIC), an electronic circuit, a microprocessor, a computer processor (shared, dedicated, or group) and memory that executes one or more software or firmware programs, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller refers to an electronic hardware controller including a storage unit capable of storing algorithms, logic or computer executable instruction, and that contains the circuitry necessary to interpret and execute instructions.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heating, ventilation, and air conditioning (HVAC) energy management control system comprising:
   an HVAC system configured to deliver at least one of heated air and cooled air to a targeted area; and
   a computing server including an HVAC energy analytics engine in signal communication with the HVAC system, the HVAC energy analytics engine configured to actively learn historical data of the HVAC system based on at least one of the heated air and the cooled air produced over a time period,
   wherein the HVAC energy analytics engine determines a predicted energy consumption of the HVAC system based on the historical data, and the HVAC system operates based on the predicted energy consumption,
   wherein the historical data is calculated as time-series data based on an indoor temperature value ($T_{idb}$), an outdoor temperature value ($T_{odb}$) and an HVAC capacity (Cap) of the HVAC unit.

2. The system of claim 1, further comprising at least one electronic terminal device in signal communication with the computing server, the at least one electronic terminal device configured to deliver at least one HVAC unit characteristic to the HVAC energy analytics engine.

3. The system of claim 2, wherein the HVAC system includes an HVAC unit that generates the heated air and the cooled air, and an HVAC controller that is configured to receive a temperature set point value, and to control the HVAC unit based on a temperature set point value.

4. The system of claim 3, wherein the historical data includes operation data, and the HVAC controller determines the operation data in response to generating, via the HVAC unit, at least one of the heated air and the cooled air.

5. The system of claim 4, wherein the operation data includes at least one of start times of the HVAC unit, stop times of the HVAC unit, run time duration of the HVAC unit, temperature settings with respect to a time of day, and room occupancy with respect to a time of the day, power usage, gas usage, cooling capacity, heating capacity, set temperature over a time period, and actual room temperature over the time period.

6. The system of claim 4, wherein the HVAC energy analytics engine comprises:
   an HVAC performance module configured to generate at least one HVAC performance map that models a performance capability of the HVAC unit based on the at least one HVAC unit characteristic;
   an HVAC historical data module configured to determine the historical data based on the operation data generated by the HVAC controller;
   a thermal load module configured to determine a thermal load characteristic of the targeted area; and
   an energy prediction module configured to calculate a predicted HVAC energy consumption of the HVAC system.

7. The system of claim 6, wherein the HVAC unit characteristics include at least one of the type of HVAC unit, the manufacture of the HVAC unit, the performance rating data of the HVAC unit, area to heated/cooled, and number of total HVAC units per building/house.

8. The system of claim 6, wherein the thermal load characteristic is based on a temperature differential ($k_1$) between an indoor temperature of the targeted area and an outside temperature, an injected air capacity ($k_2$) output to the targeted area, and temperature loads (C) applied to the targeted area.

9. The system of claim 8, wherein the temperature differential ($k_1$), the injected air capacity ($k_2$) and the temperature loads (C) are actively determined over time based on the operation data.

10. The system of claim 9, wherein the thermal load characteristic is determined in response to calculating a derivative of indoor temperature versus time.

11. The system of claim 6, wherein the energy prediction controller calculates a predicted HVAC operating cost based on the predicted HVAC energy consumption and a local energy cost, obtained through an active communication with the utility provider.

12. The system of claim 11, wherein the local energy cost includes real-time pricings of at least one of natural gas and electricity.

13. The system of claim 12, wherein the real-time pricings are obtained from at least one of the HVAC controller, the terminal device, and the computing network.

14. The system of claim 12, wherein the HVAC controller actively controls the HVAC unit based on at least one of the predicted HVAC energy consumption, the predicted HVAC operating cost, and at least one user preference.

15. The system of claim 6, wherein the energy prediction controller generates at least one HVAC performance report indicating at least one of current energy consumption, predicted energy consumption, current operating costs, predicted operating costs, cost savings strategies, energy savings reports based on setting comparisons, equipment upgrade suggestions, and real-time local energy pricings.

16. The system of claim 15, wherein the at least one terminal device displays the at least one HVAC performance report received from the energy prediction controller.

17. The system of claim 6, wherein the energy prediction module is configured to obtain first historical data of a first HVAC system installed in a first building and second historical data of a second HVAC system installed in a different second building, and compares energy performances between the first HVAC system with the second HVAC system based on the first and second historical data.

18. A method of operating a heating, ventilation, and air conditioning (HVAC) energy management control system, the method comprising:
   delivering, using an HVAC unit, at least one of heated air and cooled air to a targeted area;
   actively learning, using an HVAC energy analytics engine installed in a computing network, historical data of the HVAC system based on at least one of the heated air and the cooled air produced over a time period, the actively learning comprising calculating the historical data as time-series data based on an indoor temperature value ($T_{idb}$), an outdoor temperature value ($T_{odb}$), and an HVAC capacity (Cap) of the HVAC unit;
   determining, using the HVAC energy analytics engine, a predicted energy consumption of the HVAC system based on the historical data; and
   operating the HVAC system based on the predicted energy consumption.

19. The method of claim 18, further comprising:
   delivering, via an electronic terminal device, at least one HVAC unit characteristic of the HVAC unit;
   generating, via the HVAC energy analytics engine, at least one HVAC performance map that models a performance capability of the HVAC unit based on the at least one HVAC unit characteristic;
   determining, via the HVAC energy analytics engine, the historical data of the HVAC unit based on operation data of the HVAC unit;

determining, via the HVAC energy analytics engine, a thermal load characteristic of the targeted area;

calculating, via the HVAC energy analytics engine, a predicted HVAC energy consumption of the HVAC unit; and operating the HVAC unit based on the predicted HVAC energy consumption.

\* \* \* \* \*